United States Patent Office 3,373,849
Patented Mar. 19, 1968

3,373,849
BRAKES AND BRAKING SYSTEMS
Glyn Phillip Reginald Farr, Kenilworth, England, assignor to Girling Limited, Birmingham, England
Filed June 24, 1966, Ser. No. 560,132
Claims priority, application Great Britain,
June 26, 1965, 27,179/65
10 Claims. (Cl. 188—152)

ABSTRACT OF THE DISCLOSURE

A servo assisted vehicle brake in which the brake mounting includes relatively displaceable members which together define a servo hydraulic cylinder and piston and are displaced in a direction to increase the pressure of fluid within the servo cylinder in response to brake drag force on braking. The brake includes a hydraulic actuator which is supplied with hydraulic fluid under pressure from a master hydraulic cylinder and piston and the pressurized fluid from the servo cylinder is applied to the piston in the master hydraulic cylinder to increase the pressure of the fluid applied to the piston in the brake applying direction to thereby create the servo effect on braking.

---

Figure 1:
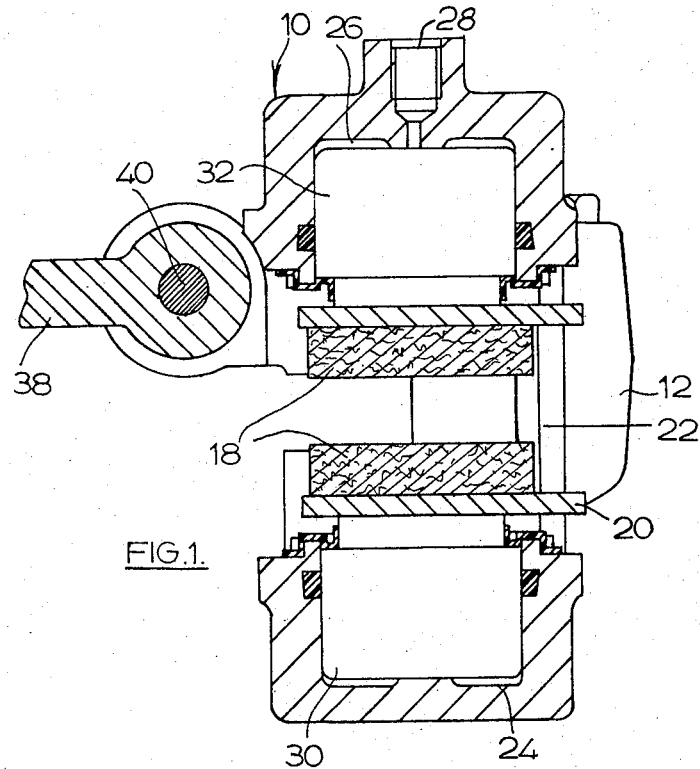

This invention concerns motor vehicle brakes and braking systems such as disc brakes and relates more particularly to disc brakes of the type comprising a housing such as a generally U-shaped caliper or a yoke or hoop member adapted to straddle a rotor such as a rotatable disc and carrying friction elements which are movable into engagement with opposite faces of the rotor by hydraulic or mechanical actuating means on the brake.

The invention seeks to provide a disc brake of the type described including servo means for assisting operation of the same or another brake as a result of the torque reaction which occurs when the friction elements engage the disc.

According to one aspect of the present invention, in a disc brake of the type described, the brake is both pivotally mounted on and slidable relative to a fixed member with which it cooperates to define servo piston and cylinder means adapted to provide pressurized fluid for brake operating purposes.

Preferably, the brake comprises a caliper having one limb which is of greater radial length than the other and which, at its free end, is provided with a pair of circumferentially spaced bosses which fit one on each side of a fixed post constituting said fixed member, with a clearance sufficient to permit a limited sliding movement of the caliper relative to the post, one of the bosses being bored to define a hydraulic cylinder within which works a piston displaceable in accordance with the sliding movement of the caliper.

According to another aspect of the invention a braking system for a vehicle comprises means for supplying hydraulic fluid under pressure to hydraulically operable brakes, each brake including servo hydraulic piston and cylinder means relatively displaceable in response to brake drag force to provide an additional source of pressurized hydraulic fluid and means for conveying the pressurized fluid from the servo cylinder and piston means to the first mentioned means to increase the pressure of the fluid supplied to the brakes and thereby create a servo effect on braking.

Preferably such a braking system comprises hydraulic master cylinder and piston means, hydraulically operable brake actuators, fluid pipeline means defining a fluid path between the master cylinder and the brakes each brake including servo hydraulic piston and cylinder means relatively displaceable in response to brake drag force on operation of the brakes, and fluid compensating means and fluid pipeline means defining a fluid path between the compensator and the master cylinder and between the compensator and the servo cylinders whereby build up in servo cylinders is conveyed to the master cylinder so as to increase the force on the master cylinder piston and thereby create a servo effect on braking.

Although the first aspect of the invention is particularly related to disc brakes it will be readily apparent that the system comprising the other aspect of the invention is equally applicable to drum brakes.

Figure 2:
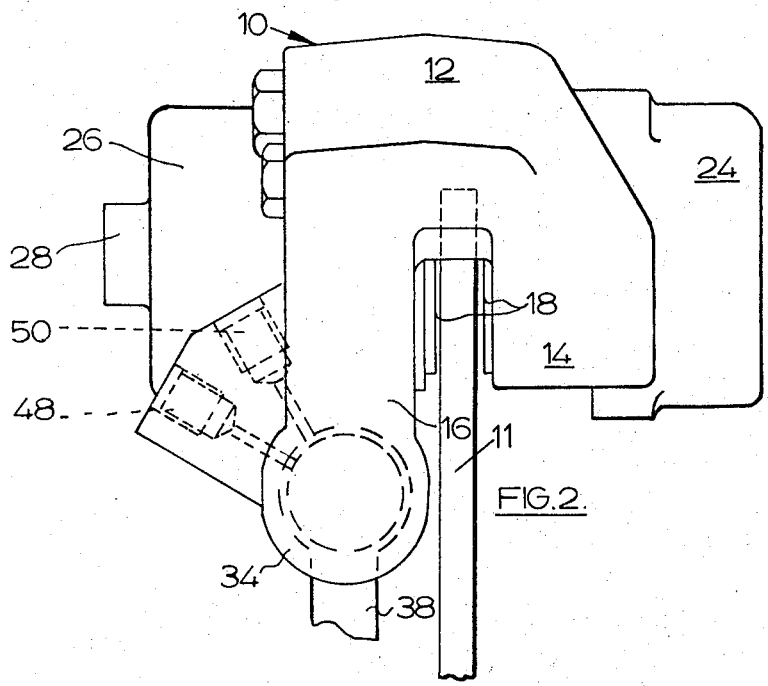
Figure 3:
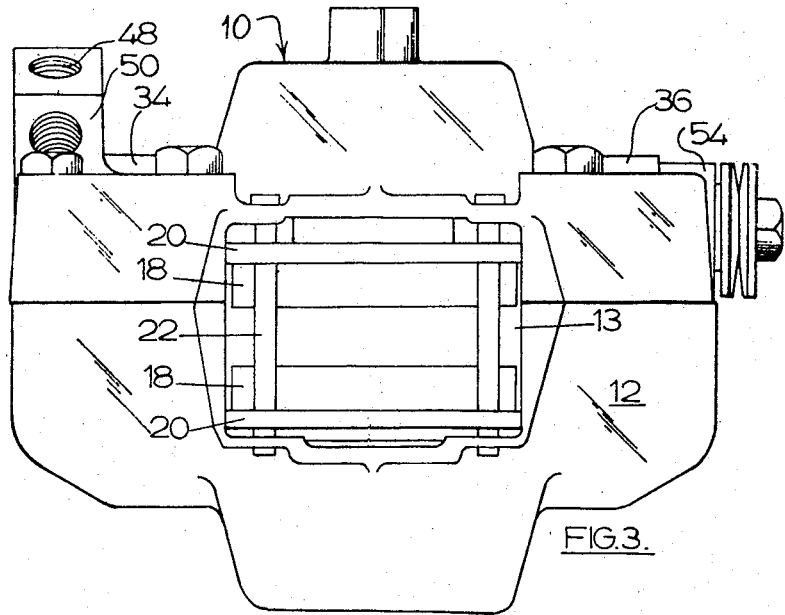
Figure 4:
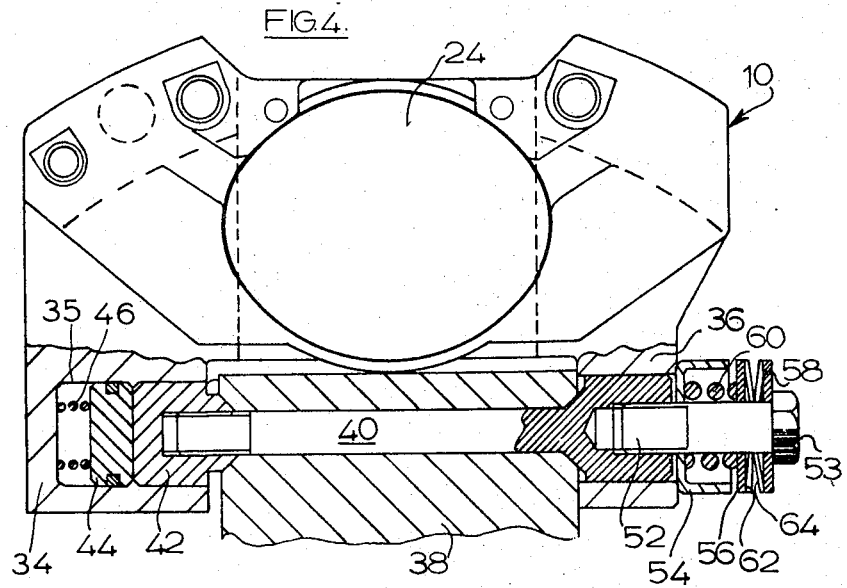
Figure 5:
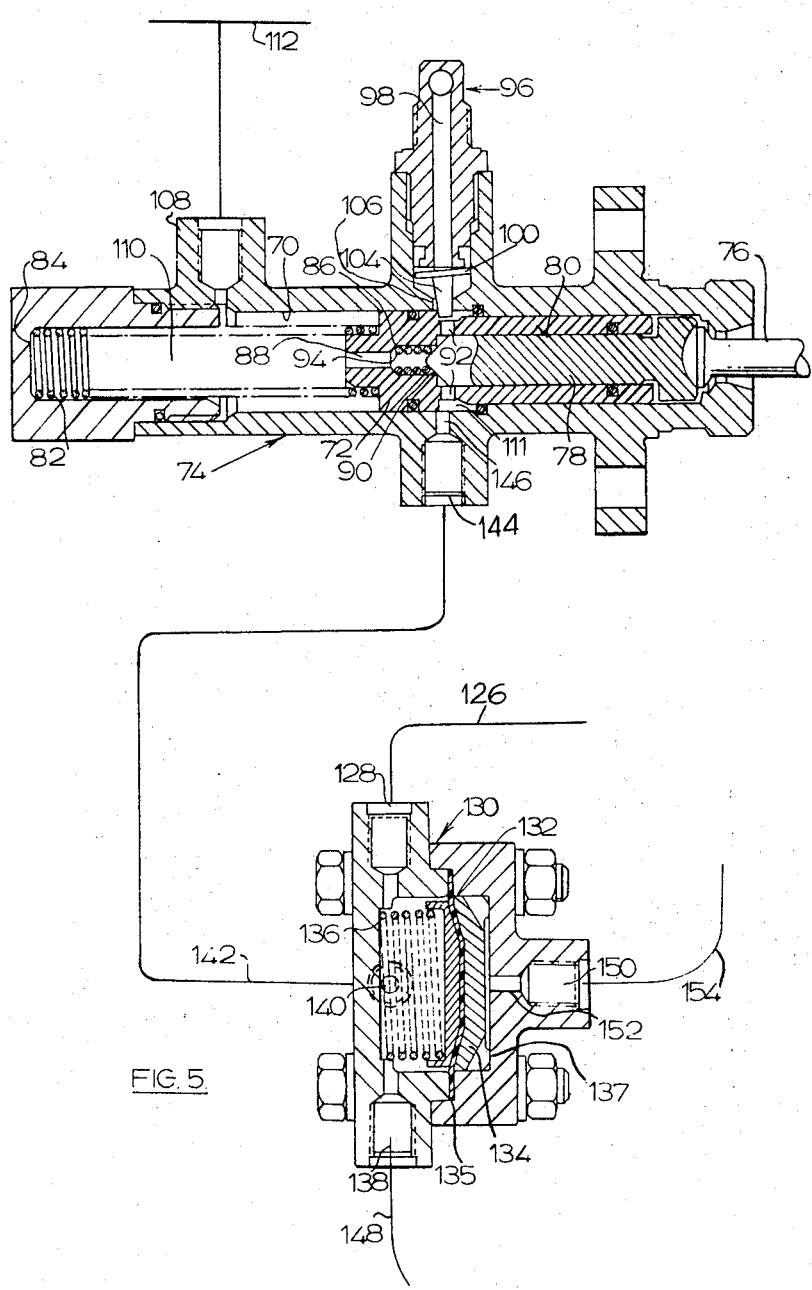
Figure 5A:
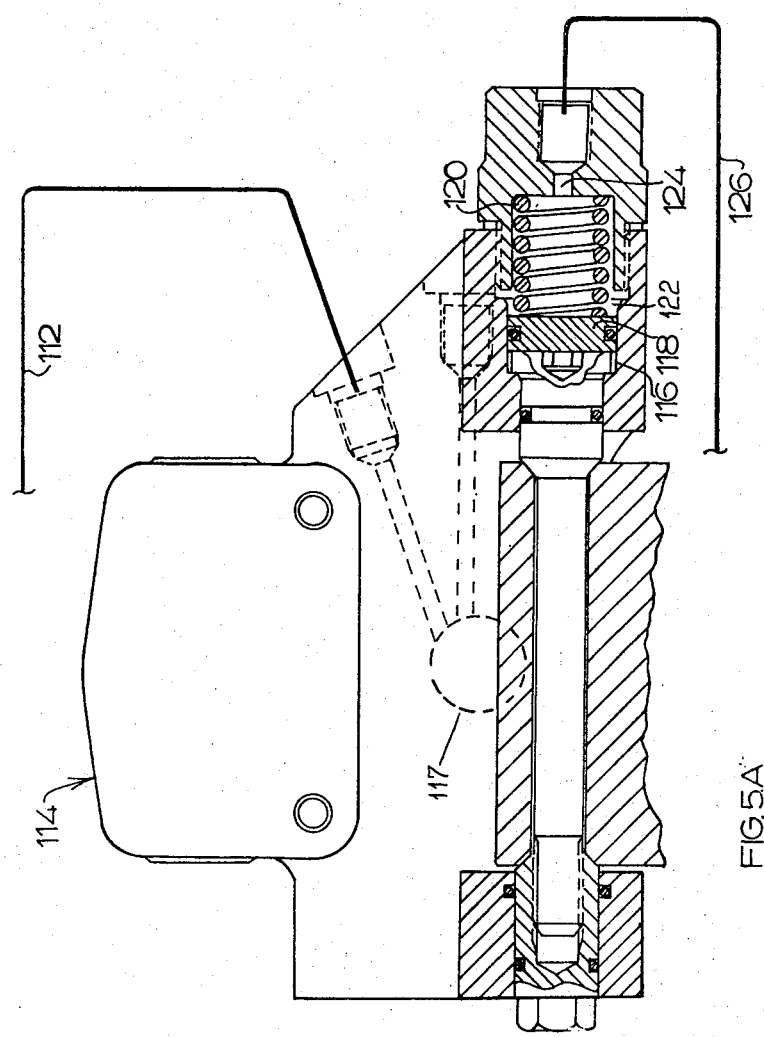

The invention will be described further, by way of example, with reference to the accompanying drawings, in which:

FIG. 1 is an axial section through a disc brake caliper embodying the invention, FIG. 2 is an end elevation thereof, FIG. 3 is a plan view, FIG. 4 is a rear elevation, FIGS. 5 and 5A illustrate partly in diagrammatic form a braking system constructed in accordance with the second aspect of the invention.

As illustrated in FIGS. 1 to 4, a caliper has a generally U-shaped housing 10 with a bridge or crown 12 which extends over the periphery of a brake disc 11 and radially extending limbs 14 and 16 of which the limb 16, is of the greater radial extent, on opposite sides of the disc 11. Each caliper limb is provided with a friction element consisting of a pad 18 of friction material and a backplate 20, the backplates 20 being mounted on axially directed pins 22 extending across the bridge 12. The bridge 12 has an opening 13 (FIG. 3) through which the friction pads can be installed. The caliper limb 14 includes a hydraulic cylinder 24, while the limb 16 has a cylinder 26, the cylinder 26 having an inlet connection 28 for hydraulic fluid and the caliper being formed with an internal hydraulic passage (not shown) by which the two cylinders communicate. A hydraulic piston 30 is located in the cylinder 24 and is engageable with the backplate 20 of the friction element associated with the limb 14 of the caliper, while a similar piston 32 is received in the cylinder 26 to cooperate with the friction element of the limb 16.

At its free end, the radially longer limb 16 of the caliper is formed with a pair of circumferentially spaced bosses 34 and 36, and between the bosses fits a fixed post 38 carrying a circumferentially directed pivot pin 40. The boss 34 is bored to define a hydraulic cylinder 35, within which fits a plug member 42 carried by the adjacent end of the pivot pin 40, and a piston 44 is arranged in the cylinder 35 and is biased against the plug 42 by a coil spring 46. The caliper is provided with hydraulic connections 48 and 50 which lead to the cylinder 35 and the purpose of which will hereinafter more fully be described.

The other end of the pivot pin 40 is of enlarged diameter and is axially bored and threaded to receive a bolt 52 upon the stem of which is mounted a cup member 54 having its base abutting the boss 36. Between the open end of the cup-shaped member 54 and the head 53 of the bolt, the stem of the bolt carries two washers 56 and 58, of which the washer 56 is biased away from the cup-shaped member 54 by a spring 60. Also on the bolt stem and between the washers 56 and 58 are provided a pair of adjoining dished cup springs or belleville washers 62 and 64, and it will be seen that by virtue of the several springs 60 to 64, the caliper 10 is normally urged against the post 38.

In the operation of the caliper provided by the invention fluid pressure from a pressure source such as a pedal operated master cylinder (not shown) is supplied through the inlet connection 28 to the pistons 30 and 32 to urge the friction elements into light braking engagement with the conventional rotating disc 11 (see FIGURE 2). At this stage the fluid pressure is of a relatively low value since only clearance take-up between the friction elements and the disc has occurred. The slight drag transmitted to the caliper is resisted by the coil spring 60, but when the spring yields, the caliper moves forward with the disc (a sufficient clearance being defined between the post 38 and the bosses 34 and 36 for this purpose), thus moving the piston 44 further into the cylinder 35 and pressurising fluid in that cylinder. Any substantial circumferential movement of the caliper 10 engages the cup member 54 with the first belleville washer 50 so that if further brake application under higher pressure takes place, the drag opposing force is substantially greater, the spring rate of the washers being substantially greater than that of the coil spring 60.

It will be appreciated that this two-stage spring reaction to the brake-applying effort renders the brake proposed by the invention more sensitive and efficient than conventional brakes, while the fluid pressures created in the servo chamber 35 may be employed to do useful work, as by augmenting the fluid pressure in all or part of a hydraulic braking system or alternatively by pushing additional fluid into all or part of a hydraulic system to assist in relatively low pressure expansion of the slave cylinder on the other brakes of a vehicle. Where the pressure in the servo cylinder 35 is used to augment the pressure in the remainder of a hydraulic system, of course, it enables the pedal load to be reduced, whilst, in the case where it is used to supplement the volume of fluid already present in a hydraulic system, it reduces the pedal travel required to operate the brakes.

In FIGS. 5 and 5a there is illustrated a complete braking system for a motor vehicle embodying caliper type disc brakes having servo means for assisting braking as hitherto described and illustrated in FIGS. 1 to 4. The system includes an hydraulic master cylinder 70 and piston 72 in a housing 74. The piston is displaceable axially in the cylinder 70 by means of a push rod 76 which acts on the piston 72 through a thrust member 78 which fits slidably in an axial bore 80 formed in the rear end of the piston 72. The piston is urged rearwardly by a spring 82 disposed in the cylinder 70 between the closed end thereof and the front end face of the piston 72.

The piston is additionally formed with an axial bore between the front end face of the piston and the axial bore 80 in the piston, this additional bore being formed with a first section 86 and a second section 88 of reduced diameter. The end of the thrust member 78 is formed with a conical axial extension 90 which is arranged to fit into the first section 86 of the bore connecting the bore 80 and the front end of the piston 72, the thrust member 78 forming a movable valve member which seats against the end of the bore 80 to close said open end of the bore section 86. The piston 72 is formed with a neck of reduced diameter in the region of the end of the bore 80 and hydraulic fluid is supplied to the annular space 111 between the neck and the bore 80. Radially directed fluid ports 92 are formed in the wall of the piston in the region of the neck. When the piston 72 and push rod 76 are in their fully retracted position the slidable thrust member 78 is displaced away from the end of the bore 80 by a spring 94 placed between the conical end 90 and the step between said first and second bore sections 86, 88 respectively.

The annular space 111 between the neck of the piston and the bore 80 is supplied with hydraulic fluid from a reservoir (not shown) through a fluid inlet designated 96. The inlet 96 includes a fluid passage 98 which is provided at its lower end with a tipping valve comprising a movable valve member 100 which is urged upwardly by a spring 102 against the valve seat formed at the end of the passage 98. The valve member 100 is formed with a downwardly extending shank portion 104 which passes through an aperture 106 in the housing wall to enter the bore 80. The axial position of the shank 104 is such that when the piston 72 is in its fully retracted position the rear facing wall of the neck engages the shank and as illustrated urges it in a rearward direction. This causes the valve member 100 to tilt and in part move away from its valve seat thereby allowing fluid to flow between the passage 98 and said annular space 111 through the aperture 106. In this way any fluid lost during operation of the braking system may be replenished from the reservoir (not shown) every time the push rod 76 and therefore piston 72 is allowed to move back into its normal, retracted position. It will be seen however that as soon as the push rod 76 is urged in a forward direction the conical end face 90 of the thrust member first closes the fluid path between said annular space 111, and the bore sections 86, 88 leading to the front end of the piston, after which the piston 72 is moved forward which allows the shank 104 to once again extend normally into the bore 80 and as a result closing the tipping valve and cutting off the passage 98 from said annular space 111.

The space 110 in front of the piston 72 is normally filled with hydraulic fluid and an outlet port 108 is provided for allowing fluid under pressure to pass from the space 110 to the rest of the braking system.

The pressurized fluid is supplied by hydraulic pipeline 112 (illustrated diagrammatically) to the hydraulic cylinder 24 of a vehicle brake caliper such as is illustrated in FIGS. 1 to 4.

A brake caliper 114 is illustrated in FIG. 5A. As hitherto described the action of braking causes relative displacement of the auxiliary piston and cylinder indicated by 44 and 35 respectively in FIGS. 1 to 4. In FIG. 5A an alternative arrangement is shown in which an auxiliary cylinder 116 and piston 118 are arranged at the same end of the caliper housing as a spring 120 which acts on the piston 118 and urges it in a direction out of the cylinder. The space 122 in front of the piston 118 is filled with hydraulic fluid and a fluid outlet 124 and pipeline 126 serve to connect this space with an inlet port 128 of a fluid compensator. The compensator comprises a housing 130 in which is formed an hydraulic cylinder 132 having a piston 134 slideably mounted therein. The piston is urged to one end 137 of the cylinder which is formed as a stop for the piston by a spring 136 arranged between the piston and the other end of the cylinder and a seal is provided between the piston and cylinder to prevent the passage of fluid past the piston. Two inlet ports 128, 138 are provided in the cylinder wall at the said one end of the cylinder and a further port 140 also formed in the cylinder wall is connected by a pipeline 142 to a fluid pipe connection 144 formed in the master cylinder housing and connected to the space 111 surrounding the neck of the piston 72 by a fluid passage 146.

The second inlet port 138 in the compensator is connected to a further hydraulic pipeline 148 which, although not illustrated in the drawings is connected to a fluid pipe connection at the end of an auxiliary hydraulic cylinder of a second vehicle brake, similar to that illustrated at 114 in FIG. 5A. In practice these two calipers would be arranged to act on rear wheel discs while a similar pair of calipers would act on front wheel discs, each caliper hydraulic cylinder 117 being connected to the master cylinder outlet 108 by a pipeline 112.

In order to prevent loss of fluid from the system, should any leak past the piston 134 and seal 135 of the compensator, a fluid passage 152 is provided in the compensator housing 130 between the end of the cylinder behind the piston 134 and a further fluid outlet 150, which is connected by hydraulic pipeline 154 to the fluid reservoir (not illustrated). Alternatively the outlet may merely be vented to atmosphere.

To effect braking the push rod 76 and thrust member 78 are moved axially to initially isolate the fluid in the space 110 in front of the piston from the fluid in the space 111 surrounding the neck of the piston and then move the piston 72 axially to the left (with reference to FIG. 5) to close the tipping valve member 100. Further movement of the piston then pressurises the fluid in the space 110 in front of the piston and brake clearance take-up is commenced.

As the piston moves forward the volume of the space 111 increases and fluid is consequently drawn from the compensator cylinder 132 and this causes the compensator piston 134 to move against the force of the spring 136. However as the brakes are applied the brake drag force will overcome the force of each spring 120 and fluid will be displaced from the auxiliary (servo) cylinders 116 to return the compensator piston 134 against its stop 137. Continued application of the brakes increases the brake drag force and therefore the pressure in the servo cylinders 116 and since this pressure is conveyed via the compensator cylinder 132 to the space 111, the pressure of the fluid behind the piston, in the space 111 will also increase. This will cause the overall force acting on the piston to increase further the pressure of the fluid supplied to the caliper cylinders 116, resulting in increased braking.

If the force applied to the push rod 76 is reduced the pressures in the spaces 111 and 110 behind and in front of the piston respectively, are reduced and as the brake drag force falls the caliper will begin to return to its normal rest position under the action of the spring 120. The fluid requirement of the servo cylinders as the volume between each piston 118 and cylinder 116 increases, is met by appropriate movement of the compensator piston 134 if movement of the master cylinder piston to its rest position is prevented by the brake pedal.

When the brake is released the master cylinder piston 72 returns to its normal rest position under the action of the spring 82 and the fluid forced out of the space 111 in consequence of the piston movement causes the compensator piston to move back towards its stop 137. As soon as the piston 72 is fully retracted the tipping valve member 100 is moved off its valve seat and the conical extension 90 of the thrust member 78 leaves the open end of the bore section 86 under the action of the spring 94, whereupon the two spaces 111 and 110 are once again interconnected and also connected to the fluid reservoir (not shown).

Each brake caliper at least for the rear brakes is operable by a rocking lever which is movable both mechanically and hydraulically and acts on the directly applied friction pad through a thrust member of adjustable length—the other (indirectly operable) pad being applied by reaction force. If the brakes are applied mechanically whilst the vehicle is moving in a forward direction, the tipping valve member 100 will be open so that displacement of each caliper and the resulting relative movement of each auxiliary (servo) piston and cylinder 118, 116 respectively, merely causes fluid to be displaced from the servo cylinders 116 to the reservoir (not shown). When the brake is released the increase in volume of the servo cylinders 116 causes fluid to be drawn from the reservoir (not shown) to replenish that previously expelled from the servo cylinders 116.

I claim:

1. A braking system for a vehicle comprising in combination, at least one hydraulically actuated brake, master hydraulic cylinder and piston means for supplying hydraulic fluid under pressure through the hydraulic actuator of the brake, servo hydraulic piston and cylinder means formed in said brake and relatively displaceable in response to brake drag force to provide an additional source of pressurized fluid, and means for conveying the pressurized fluid from the servo cylinder to the piston in the master hydraulic cylinder to increase the pressure of the fluid applied to the piston in the brake applying direction and thereby create a servo effect on the braking.

2. A braking system as set forth in claim 1 comprising fluid compensating means located between said servo means and said master cylinder.

3. A fluid compensator for use in the system set forth in claim 2 comprising in combination,
   a housing formed with a hollow cylindrical interior,
   a piston slidably displaceable in the cylinder,
   stop means formed at one end of the cylinder,
   spring means arranged to act on the piston to urge it against said stop means, and
   outlet means formed in the end of the cylinder at the end thereof remote from said stop means, for supplying fluid from the compensator cylinder to said master cylinder and said hydraulic actuator.

4. A fluid compensator as set forth in claim 3 further comprising, additional fluid outlet means formed in the end of the compensating cylinder containing said stop means and serving to connect the cylinder to an atmospheric pressure source.

5. A master cylinder for use in the system as set forth in claim 1 comprising, in combination,
   a housing formed with a hollow cylindrical interior defining an hydraulic cylinder which is closed at one end,
   fluid outlet means formed in the closed end of the cylinder,
   a piston slidably displaceable in the cylinder to displace fluid under pressure from the cylinder to said hydraulic brake actuator,
   spring means acting on the piston to urge it in a direction away from said closed end,
   a fluid reservoir,
   fluid port means and valve means for permitting fluid flow between the reservoir and the hydraulic cylinder when the piston is in its fully retracted position, and
   additional fluid port means for supplying pressurized fluid from the servo cylinder to the master cylinder piston to increase the force acting thereon in the brake applying direction.

6. A master cylinder as set forth in claim 5 wherein the piston is formed with an axial through bore having three sections of successively reduced diameter, the largest diameter section opening into the rear of the piston and serving to sealingly receive a thrust member which is acted on by a push rod, the forward end of the thrust member being formed with a conical axial extension adapted to fit sealingly into the open end of the middle section of the through bore and the thrust member being urged rearwards out of the bore in the piston by a spring disposed in the middle section between the conical end face of the thrust member and the annular shoulder defining the open end of the section of smallest diameter, said conical end face and the open end of said middle section constituting a valve member and valve seat respectively of a normally open valve for controlling the flow of fluid between the hydraulic cylinder in front of the piston and at least two radially directed ports formed in the wall of the piston in the section of greatest diameter, said ports communicating with an annular space between the cylinder wall and a neck of reduced diameter formed in the piston in the region of said ports, and two further ports are formed in the cylinder wall communicating with said anular space one of these two further ports housing a tipping valve having a stem which extends through the port and is engaged and tipped to open the valve by the rear face of the piston when the latter is in its fully retracted position to allow fluid flow between the reservoir connected to said one port on the other side of said tipping valve and said annular space, while the other port constitutes said further fluid port means for supplying pressurized fluid from the servo cylinder to said annular space.

7. A disc brake for use in the system as set forth in claim 1 comprising in combination, a rotatable disc, a housing adapted to straddle the disc, friction elements carried by the housing and movable into engagement with opposite faces of the disc, hydraulic or mechanical actuator means for selectively operating the friction elements into engagement with the disc, and a fixed member on and about which the brake is slidably and pivotally mounted, and with which the housing cooperates to define servo piston and cylinder means adapted to provide pressurized fluid for brake operating purposes.

8. A disc brake as set forth in claim 7 wherein the housing is in the form of a U-shaped caliper one limb of which is of greater radial length than the other and which, at its free end is formed with a pair of circumferentially spaced bosses which fit one on each side of a fixed post, constituting said fixed member with a clearance sufficient to permit a limited sliding movement of the caliper relative to the port, one of the bosses being bored to define an hydraulic cylinder which constitutes the servo cylinder within which works a piston displaceable in accordance with the sliding movement of the caliper.

9. A disc brake as set forth in claim 8 further comprising spring means between the piston and the opposed end face of the servo cylinder arranged to provide a restoring force for returning the caliper to its normal position when the brake is released.

10. A disc brake as set forth in claim 8 further comprising a pivotable lever which acts on the directly operated brake pad through a thrust member of adjustable length said pivotable lever being operable to effect engagement of the directly operated brake pad selectively by hydraulic and mechanical means and the indirectly operated brake pad being operable into engagement with the disc by reaction force.

References Cited

UNITED STATES PATENTS

| 3,044,580 | 7/1962 | Butler | 188—152 X |
| 3,100,553 | 8/1963 | Butler | 188—73 |
| 3,269,490 | 8/1966 | Swift | 188—73 |

FOREIGN PATENTS

| 663,403 | 8/1938 | Germany. |

MILTON BUCHLER, *Primary Examiner.*

G. E. HALVOSA, *Assistant Examiner.*